Feb. 23, 1932.  W. P. DOWNS  1,846,189
INFLATING NIPPLE
Filed April 17, 1930
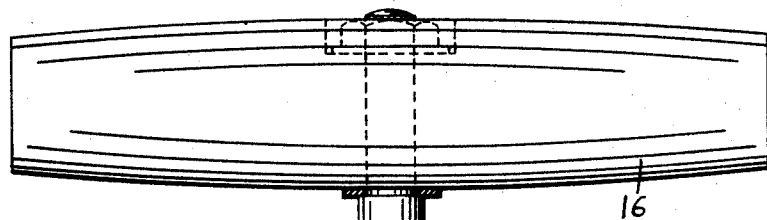
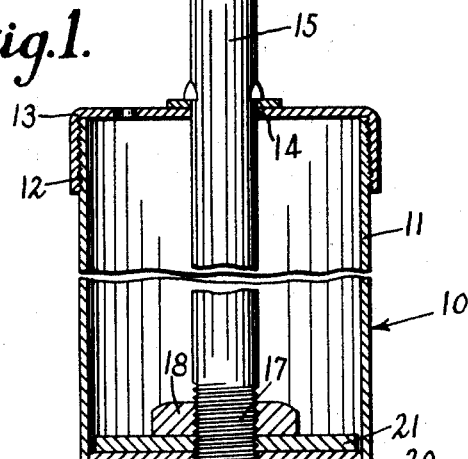
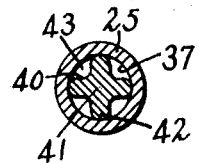
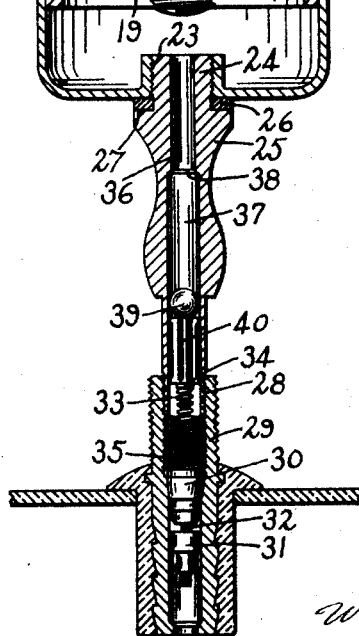
Inventor
William P. Downs
By Rockwell & Bartholow
Attorneys Patented Feb. 23, 1932

1,846,189

UNITED STATES PATENT OFFICE

WILLIAM P. DOWNS, OF BRIDGEPORT, CONNECTICUT, ASSIGNOR TO BRIDGEPORT BRASS COMPANY, OF BRIDGEPORT, CONNECTICUT

INFLATING NIPPLE

Application filed April 17, 1930. Serial No. 445,113.

My invention relates to an inflating nipple and more especially to an inflating nipple suitable for connecting a pump to the bladder of a football or the like.

Many of the footballs now in use are provided with bladders having valves for preventing the escape of air, these valves generally taking the form of the valve insides such as are used in automobile tires, and being mounted in stems which are embedded in tubes or necks connected to the bladders. In order that the valve of the valve insides may not have to be unseated upon each stroke of the pump, and in order to permit the free flow of air from the pump into the bladder, it is an object of the present invention to provide an arrangement in a nipple of the above character for holding the valve unseated when the nipple is connected to the bladder.

A further object of the invention is to provide an arrangement wherein the nipple may be used with valves of various types which will be uniformly unseated when the nipple is connected to the bladders for inflating purposes.

A further object of the invention is to provide a nipple wherein the escape of air from the bladder is prevented during the inflation thereof.

To these and other ends, the invention consists in the novel features and combinations of parts to be hereinafter described and claimed.

In the drawings:

Fig. 1 is an elevational view in section of an inflating nipple according to my invention, showing the nipple in use in connection with one form of valve insides;

Fig. 2 is a view of the nipple in use in connection with a different form of valve insides, and Fig. 3 is a cross-sectional view along line 3—3 of Fig. 2.

Referring to the drawings in which I have illustrated my invention by showing a preferred embodiment of the same, the reference numeral 10 indicates in general a pump which may be of any preferred form, and which, as shown, comprises a barrel 11, which is threaded at its upper end 12 for the reception of cap 13, the latter being provided with an axial opening 14 in which the pump rod 15 is mounted. On the upper end of pump rod 15 is a handle 16, which may be secured thereon in any suitable manner. The lower end of rod 15 is threaded, as at 17, for the reception of nuts 18 and 19, which serve to clamp the usual cup-shaped leather packing 20, between washers 21 and 22.

In the lower end of barrel 11 is an axially directed threaded opening 23 in which the reduced and threaded end 24 of nipple 25 is received, a leather washer or other packing member 26 being interposed between the shoulder 27 on nipple 25 and the end of the pump barrel, in order to prevent the escape of air around the threaded end of the nipple.

The lower end of nipple 25 is threaded, as at 28, for reception in valve stem 29, which may be of any suitable form and in which a valve insides 30 is received, valve insides 30 comprising in general a valve 31, valve stem or rod 32 and valve spring 33 which, at one end, engages head 34 on rod 32 and at the other end engages plug 35 to urge valve 31 to seated position on the lower end of plug 35.

Nipple 25 is provided with an axial bore 36, which is enlarged at 37 to provide a seat 38 for ball check valve 39, which is of less diameter than bore 37 to provide for the free passage of air through the nipple. Movement of check valve 39 away from seat 38 is limited by plug 40, which preferably has a solid core 41 and axially directed ribs 42 which engage the walls of bore 37 in friction tight engagement to hold the plug against movement in the nipple. The lower end of plug 40 is spaced inwardly from the end of nipple 25 and serves to engage the end of valve rod 32, to unseat valve 31 when the nipple is threaded into the stem 29. It will be readily understood that the spaces 43 between the ribs 42 of plug 40 provide for the free passage of air between the plug and nipple.

In Fig. 2 of the drawings I have shown the improved nipple when used with a different form of valve insides from that shown in Fig. 1. In the form shown in Fig. 2 the spring 44 engages a shoulder on valve stem 45 to urge valve 46 against the lower end of plug 47, plug 40 engaging the upper end of valve rod 48 when the nipple 25 is received in stem 45 to unseat valve 46. The valve rod 48 is provided near its upper end with the usual wings 49 which in the present instance are received within the lower end of the nipple when the latter is threaded into the stem. It is to be noted that the ability of the nipple to unseat the valve does not depend on the presence of the wings, the plug 40 engaging the upper end of the valve rod for unseating purposes as in Fig. 1.

From the above description of the invention, it will be readily understood that the nipple 25 is threaded into the valve stem of the bladder to be inflated, the plug 40 at the lower end of the nipple engaging the valve rod of the valve insides to unseat the valve thereof whereupon air may pass freely into the bladder, the return flow of air into the pump being prevented by ball check valve 39, engaging seat 38.

While I have shown and described a preferred embodiment of my invention, it will be understood that it is not to be limited to all of the details shown, but is capable of modification and variation within the spirit of the invention and within the scope of the appended claims.

What I claim is:

1. A nipple for a pump for a football bladder or the like having a stem and a valve insides mounted in the stem, said nipple being threaded at one end for connection to said stem, and having a passage for air extending therethrough, a valve seat in said passage remote from said end, said passage being of substantially uniform diameter between the valve seat and said end, a member fixedly mounted in said passage adjacent said end and adapted to unseat the valve insides when the nipple is received in the stem, and a ball valve in said passage and having free movement between the valve seat and said member.

2. A nipple for a pump for a football bladder or the like, having a stem, and valve insides mounted in the stem, said nipple being threaded at one end for connection to said stem, and having a passage for air extending therethrough, said passage being of uniform diameter between the valve seat and said end, a member fixedly mounted in said passage adjacent said end and adapted to unseat the valve insides when the nipple is received in the stem, said member being generally of cruciform cross-section, a ball valve in said passage having free movement between the valve seat and said member.

3. A nipple for a pump for an inflatable article or the like having a stem and a valve mounted in the stem, said nipple having a bore extending axially therethrough, and a member fixedly mounted within the nipple bore and adapted to unseat the valve in the stem as the nipple is brought into engagement with the stem, and a check valve mounted in the bore of the nipple to prevent the escape of air from the inflatable member as it is being inflated.

In witness whereof, I have hereunto set my hand this 15th day of April, 1930.

WILLIAM P. DOWNS.